United States Patent
Uji

(10) Patent No.: US 7,678,179 B2
(45) Date of Patent: Mar. 16, 2010

(54) METHOD OF PROCESSING VOLATILE ORGANIC COMPOUND BY USING GAS TURBINE AND PROCESSING SYSTEM OF VOLATILE ORGANIC COMPOUND

(75) Inventor: Shigekazu Uji, Ichikawa (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 430 days.

(21) Appl. No.: 11/626,161

(22) Filed: Jan. 23, 2007

(65) Prior Publication Data

US 2007/0175327 A1 Aug. 2, 2007

(30) Foreign Application Priority Data

Jan. 30, 2006 (JP) .............................. P2006-021163

(51) Int. Cl.
*B01D 53/02* (2006.01)
(52) U.S. Cl. .............................. 95/148; 95/141; 95/143; 95/139; 96/143; 96/146
(58) Field of Classification Search .................. 95/141, 95/121, 148, 118, 143, 139; 96/143, 146
See application file for complete search history.

(56) References Cited

U.S. PATENT DOCUMENTS

| | | | |
|---|---|---|---|
| 5,137,547 A | 8/1992 | Chretien | ......................... 55/16 |
| 6,139,604 A * | 10/2000 | Gottzmann et al. | ............. 95/54 |
| 2005/0109207 A1* | 5/2005 | Olander et al. | ................. 95/141 |

FOREIGN PATENT DOCUMENTS

| | | |
|---|---|---|
| JP | S62-203929 | 9/1987 |
| JP | S63-20020 | 1/1988 |
| JP | 2003-322324 | 11/2003 |
| JP | 2004-036492 | 2/2004 |
| JP | 2004-184003 | 7/2004 |
| JP | 2004-316476 | 11/2004 |
| RU | 2096071 | 11/1997 |
| SU | 454360 | 12/1974 |
| SU | 958665 | 9/1982 |
| SU | 1690826 | 11/1991 |

OTHER PUBLICATIONS

Office Action issued on Apr. 22, 2008 in counterpart Russian Patent Application No. 2007103078 with English translation.
Office Action and English translation thereof in corresponding Russian Application No. 2007103078.

* cited by examiner

*Primary Examiner*—Michael A Marcheschi
*Assistant Examiner*—Karla Hawkins
(74) *Attorney, Agent, or Firm*—Ostrolenk Faber LLP

(57) ABSTRACT

A processing system according to the present invention is provided including: an adsorption apparatus in which a volatile organic compound contained in gas to be treated is adsorbed in a predetermined absorption agent, and said volatile organic compound thus adsorbed is desorbed using steam under a pressurized environment and mixed with the steam; a gas turbine having a combustor in which the steam mixed with the volatile organic compound is burnt; and a steam generating apparatus which generates steam through the use of the heat of the combustion gas discharged from the gas turbine; and wherein, by supplying compressed air discharged from the gas turbine to the adsorption apparatus, condensation of the steam in the adsorption apparatus at the time of the desorption of the volatile organic compound is suppressed.

5 Claims, 4 Drawing Sheets

METHOD OF PROCESSING VOLATILE ORGANIC COMPOUND BY USING GAS TURBINE AND PROCESSING SYSTEM OF VOLATILE ORGANIC COMPOUND

BACKGROUND OF THE INVENTION

1. Field of the Invention

The present invention relates to a method of processing and a processing system of a gaseous volatile organic compound by using a gas turbine. The present application is based on Japanese Patent Application No. 2006-021163, filed Jan. 30, 2006, the content of which is incorporated herein by reference.

2. Description of the Related Art

Factories, which use various types of volatile organic compounds such as toluene, xylene, or the like, are provided with treatment facilities for processing exhaust gases containing volatile organic compounds. As a method of processing a volatile organic compound in such treatment facilities, exhaust gas containing the volatile organic compound is firstly supplied to an adsorption apparatus, and the volatile organic compound is adsorbed in an adsorption agent such as activated carbon, and then, the volatile organic compound adsorbed in the adsorption agent is desorbed from the adsorption agent by using steam and mixed with the steam. Thereafter, the steam which has adsorbed the volatile organic compound is condensed, and the condensed water is distilled, such that the volatile organic compound and the water are separated. Then, thus separated volatile organic compound is burnt and decomposed.

In the conventional treatment method, in addition to the cost necessary for installing a treatment facility, the running cost of the facility increase. A technique has been proposed for processing and decomposing a volatile organic compound, without extra costs, by using an existing gas turbine provided in a factory (see, for example, Japanese Unexamined Patent Applications, First Publications No. 2003-322324, No. 2004-036492, and No. 2004-184003).

In the invention described in Japanese Unexamined Patent Application, First Publication No. 2003-322324, a hazardous substance is scavenged from a volatile organic compound, and supplied to an air intake port of a gas turbine, and then compressed along with air in a compressor. The compressed air containing the hazardous substance is supplied to a combustor and fuel gas is concurrently supplied thereto, and they are burnt to thereby drive a turbine. The hazardous substance is burnt in the combustor and thus rendered harmless, and then discharged into the atmosphere together with exhaust gas of the gas turbine.

In the inventions described in Japanese Unexamined Patent Applications, First Publications No. 2004-036492 and No. 2004-184003, waste fluid containing a volatile organic compound is directly supplied to a combustor and fuel gas is also supplied thereto, and then, they are burnt in the combustor to thereby drive a turbine. The waste fluid which possesses a hazardous substance is burnt in the combustor and rendered harmless, and then discharged into the atmosphere together with exhaust gas of the gas turbine.

Incidentally, in the above-described method of processing the volatile organic compound, steam is used whereby the volatile organic compound is desorbed from the adsorption agent. Therefore, at the time of desorbing, a part of steam is condensed and changed to condensed water. The condensed water is discharged as drain water from the adsorption apparatus and contains a volatile organic compound. To realize complete decomposition or processing of the volatile organic compound, it is necessary to carry out a decomposing process with respect to the volatile organic compound contained in the drain water. To carry this out, it is necessary to particularly provide wastewater-treatment equipment for decomposing the volatile organic compound contained in the drain water, and therefore, there is a concern that cost of equipment increases. Further, the larger the amount of the drain water, the larger the wastewater-treatment equipment necessary becomes. Thus, the cost of the wastewater-treatment equipment is increased.

SUMMARY OF THE INVENTION

The present invention has been devised in consideration of the above circumstances, with an object of suppressing or preventing condensation of steam at the time of desorbing and thus reducing cost for processing a volatile organic compound.

In order to achieve the above object, according to the present invention, a means is provided as a first solution means according to a processing system of a volatile organic compound, comprising: an adsorption apparatus in which a volatile organic compound contained in gas to be treated is adsorbed in a predetermined absorption agent, and said volatile organic compound thus adsorbed is desorbed using steam under a pressurized environment and mixed with the steam; and a gas turbine having a combustor in which the steam mixed with the volatile organic compound is burnt; and wherein, by using compressed air, condensation of the steam in the adsorption apparatus at the time of the desorption of said volatile organic compound is suppressed or prevented.

As a second solution means according to the processing system of the volatile organic compound, a means is provided in the first solution means, wherein compressed air fed from the gas turbine is supplied to the adsorption apparatus to thereby suppress or prevent the condensation of the steam.

As a third solution means according to the processing system of the volatile organic compound, a means is provided in the first or second solution means, wherein compressed air discharged from the adsorption apparatus is supplied to the combustor and used as combustion gas.

As a fourth solution means according to the processing system of the volatile organic compound, a means is provided in any of the first through third solution means, wherein it further comprises a steam bypass control valve which controls a flow of steam directly supplied to the combustor without being passed through the adsorption apparatus.

As a fifth solution means according to the processing system of the volatile organic compound, a means is provided in the fourth solution means, wherein it further comprises a suction apparatus which is provided between the adsorption apparatus and the steam bypass control valve and driven by steam to be supplied to the adsorption apparatus such that compressed air of the gas turbine is supplied to the adsorption apparatus.

As a sixth solution means according to the processing system of the volatile organic compound, a means is provided in any of the first through fourth solution means, wherein it further comprises a suction apparatus which is provided at a steam supply port of the adsorption apparatus and driven by steam to be supplied to the adsorption apparatus such that the compressed air of the gas turbine is supplied to the adsorption apparatus.

As a seventh solution means according to the processing system of the volatile organic compound, a means is provided in the fifth or sixth solution means, wherein the suction apparatus comprises an ejector.

As a eighth solution means according to the processing system of the volatile organic compound, a means is provided in any of the first through seventh solution means, wherein it further comprises a steam generating apparatus which generates steam through the use of heat of the combustion gas discharged from the gas turbine.

On the other hand, according to the present invention, a means is provided as a first solution means according to a method of processing a volatile organic compound by using a gas turbine, wherein the means or method of processing a volatile organic compound by using a gas turbine, comprises: adsorbing in an adsorption agent a volatile organic compound contained in gas to be treated; desorbing the volatile organic compound adsorbed in the adsorption agent from the adsorption agent by the use of steam and mixing it with the steam, under a pressurized state and a state in which condensation of the steam is suppressed or prevented by the use of compressed air; and burning the steam mixed with the volatile organic compound in a combustor of the gas turbine.

As a second solution means according to the method of processing the volatile organic compound by using the gas turbine, a means is provided in the first solution means, wherein the compressed air is generated by the gas turbine.

As a third solution means according to the method of processing the volatile organic compound by using the gas turbine, a means is provided in the first or second solution means, wherein the compressed air used for desorbing the volatile organic compound from the adsorption agent is supplied to the combustor to serve as combustion air.

As a fourth solution means according to the method of processing the volatile organic compound by using the gas turbine, a means is provided in any of the first through third solution means, wherein part of the steam is supplied directly to the combustor without being used for desorbing the volatile organic compound.

As a fifth solution means according to the method of processing the volatile organic compound by using the gas turbine, a means is provided in any of the first through fourth solution means, wherein the state in which the condensation of the steam is suppressed by the use of the compressed air is related to heating the steam by the use of the compressed air in a pre-process before desorbing the volatile organic compound from the adsorption agent by the use of the steam.

As a sixth solution means according to the method of processing the volatile organic compound by using the gas turbine, a means is provided in any of the first through fourth solution means, wherein the state in which the condensation of the steam is suppressed through the use of the compressed air is related to mixing the steam and the compressed air and making the mix to serve for desorbing the volatile organic compound.

According to the present invention, since the volatile organic compound adsorbed in the adsorption agent is desorbed from the adsorption agent by using steam in a state in which condensation of the steam is suppressed or prevented by using compressed air, there is no need to provide a facility for treating condensed water contained volatile organic compounds. Even if such a facility might be provided, the size thereof can be reduced. Hence, it is possible to reduce the cost of equipment, as compared to the conventional facility.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE INVENTION

With reference to the drawings, embodiments of the present invention will now be described.

First Embodiment

Figure 1:
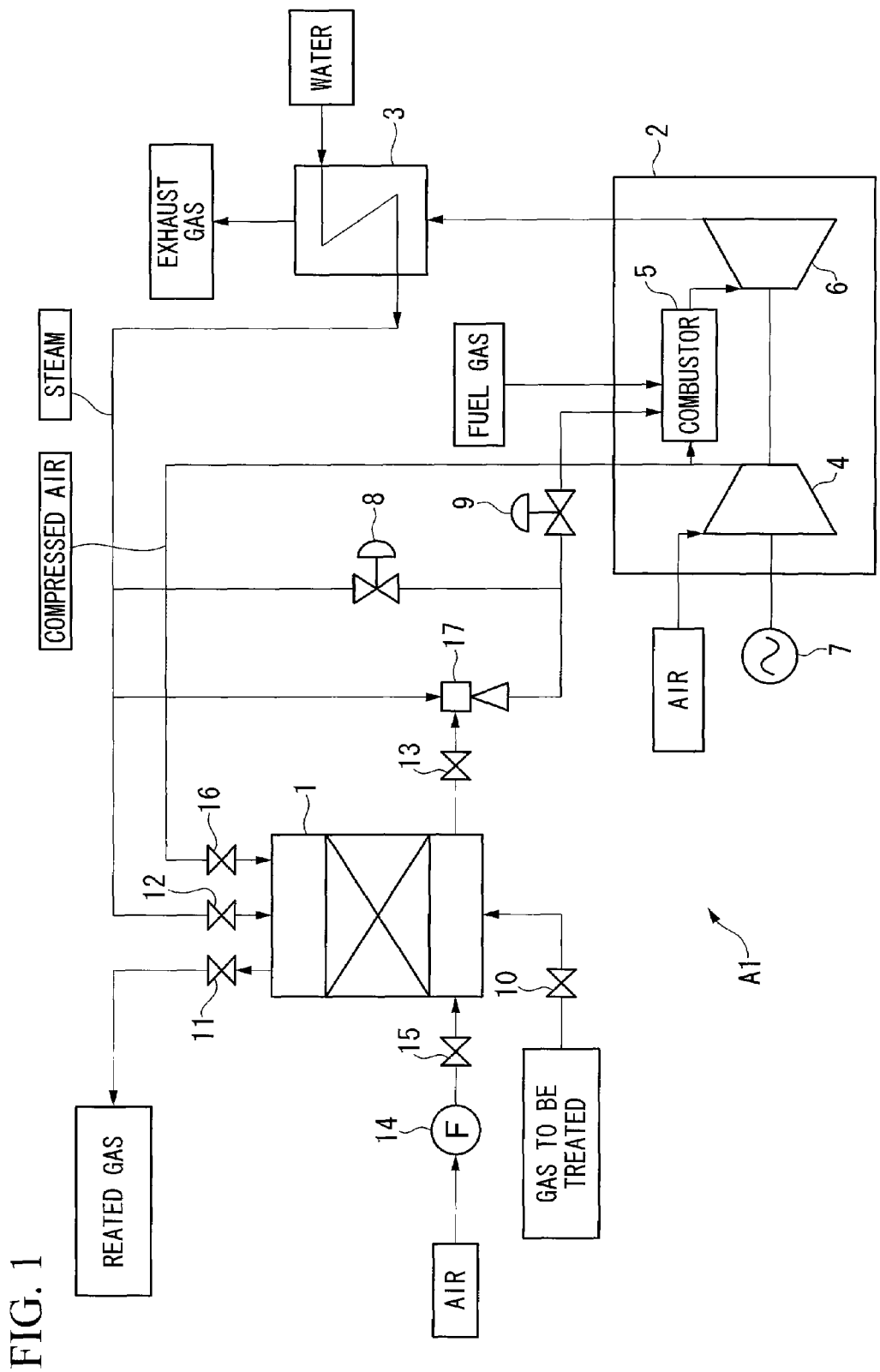
FIG. 1 is a system structural view illustrating a characteristic configuration of a volatile organic compound processing system according to a first embodiment of the present invention.

FIG. 1 is a view illustrating a structure of a volatile organic compound processing system A1 according to a first embodiment of the present invention. In this figure, numerical reference 1 indicates an adsorption apparatus, 2 indicates a gas turbine, 3 indicates a steam generating apparatus, 4 indicates a compressor, 5 indicates a combustor, 6 indicates a turbine, 7 indicates a load, 8 indicates a steam bypass control valve, 9 indicates a steam injection control valve, 10 indicates a gas to be treated supply valve (hereinafter referred to simply as "untreated gas supply valve"), 11 indicates a treated gas discharge valve, 12 indicates a steam supply valve, 13 indicates a steam discharge valve, 14 indicates a cooling air fan, 15 indicates a cooling air supply valve, 16 indicates a compressed air supply valve, and 17 indicates an ejector.

As shown in FIG. 1, the adsorption apparatus 1 is disposed in a parallel manner with respect to a supply path of untreated gas (or gas to be treated) and a supply path of steam. As described hereinafter, the adsorption apparatus 1 alternately implements a removal of a volatile organic compound from the gas to be treated (or the untreated gas). In the adsorption apparatus 1, a volatile organic compound contained in the gas to be treated is adsorbed in an inside absorption agent whereby the volatile organic compound is removed from the gas to be treated, and the volatile organic compound adsorbed in the absorption agent is desorbed with the aid of steam under a pressurized environment and mixed in the steam. As an example of the absorption agent, activated carbon can be used.

In more detail, in the adsorption apparatus 1, a gas to be treated (untreated gas) is supplied from the outside, whereas steam is supplied from the steam generating apparatus 3. Then, the treated gas with the volatile organic compound removed is discharged to the outside, and at the same time, a steam with the volatile organic compound contained and mixed therein is discharged and fed into the combustor 5 of the gas turbine 2. Further, the adsorption apparatus is structured such that air is introduced with the aid of the cooling air fan 14 from the outside in order to cool the absorption agent described above.

The gas turbine 2 is comprised of the compressor 4, the combustor 5 and the turbine 6. As is illustrated, the compressor 4 and the turbine 6 are connected to the load 7 in an axial bond manner. The compressor 4 compresses air supplied from the outside and then supplies the compressed air to the combustor 5 and the compressed air supply valve 16. In the combustor 5, steam containing a volatile organic compound supplied through the steam discharge valve 13, the ejector 17, and the steam injection control valve 9 from the adsorption apparatus 1, the above-described compressed air, and fuel gas supplied from the outside are mixed and then burned. High temperature combustion gas is thereby generated and then discharged to the turbine 6. The turbine 6 is driven for rotation by the kinetic energy and pressure of the combustion gas to thereby generate a drive force for an external load 7. The combustion gas, after having been used for driving the turbine for rotation, is discharged and supplied to the steam generating apparatus 3. The steam containing organic compound, while being remained in a pressurized state, is supplied to a combustion region of the combustor 5, and burnt together with the fuel gas. The external load 7 is, for example, a dynamo or a generator.

The steam generating apparatus 3 which uses heat supplied from the gas turbine 2 to generate steam is a kind of heat exchanger. The steam generating apparatus 3 is, for example, an exhaust heat recovery boiler. The steam in a pressurized state generated in the steam generating apparatus 3 is fed to the outside for plant process use, and is also supplied to the steam supply valve 12, the steam injection control valve 9 and the ejector 17.

The steam bypass control valve 8 is a valve which is provided between an inlet of the steam supply valve 12 and an outlet of the ejector 17 (or at a steam discharge port of the steam generating apparatus 3 and an inlet of the ejector 17). The steam bypass control valve 8 enables part of the steam to be supplied to the adsorption apparatus 1 to directly flow into the steam injection control valve 9 without passing through the adsorption apparatus 1. It follows that the steam bypass control valve 8 is for supplying a part of steam discharged from the steam generating apparatus 3 to the steam injection control valve 9 with the adsorption apparatus 1 being bypassed.

The steam injection control valve 9 is provided between the steam bypass control valve 8 and the gas turbine 2 (specifically, the combustor 5) and controls the injection quantity of steam with respect to the gas turbine 2. The untreated gas supply valve 10 is an open/close valve which is provided at an untreated gas supply port of the adsorption apparatus 1 and which controls supply/shutoff of untreated gas with respect to the adsorption apparatus 1.

The treated gas discharge valve 11 is an open/close valve which is provided at a treated gas discharge port of the adsorption apparatus 1 and which controls the discharge/shutoff of treated gas from the adsorption apparatus 1. The steam supply valve 12 is an open/close valve which is provided at a steam supply port of the adsorption apparatus 1 and which controls the supply/shutoff of steam with respect to the adsorption apparatus 1. The steam discharge valve 13 is an open/close valve which is provided at a steam (containing compound) discharge port of the adsorption apparatus 1 and which controls discharge/shutoff of steam containing compound from the adsorption apparatus 1.

The cooling air fan 14 is a power source to supply cooling air to the adsorption apparatus 1. The cooling air supply valve 15 is an open/close valve which is provided between the cooling air fan 14 and the adsorption apparatus 1 and which controls the supply/shutoff of cooling air with respect to the adsorption apparatus 1. The compressed air supply valve is an open/close valve which is provided at a compressed air supply port of the adsorption apparatus 1 and which controls supply/shutoff of compressed air with respect to the adsorption apparatus 1.

The ejector 17 is a steam-driven type of suction apparatus which is provided between the steam discharge port of the steam generating apparatus 3 and an input end of the steam injection control valve 9 (or an output end of the steam bypass control valve 8) and which draws compressed air from the adsorption apparatus 1 in accordance with the widely known principle of atomization. More specifically, the ejector 17 draws compressed air from the adsorption apparatus 1 through the steam discharge valve 13 by using a flow of steam supplied from the steam generating apparatus 3, and mixes the compressed air into the steam.

Figure 2:
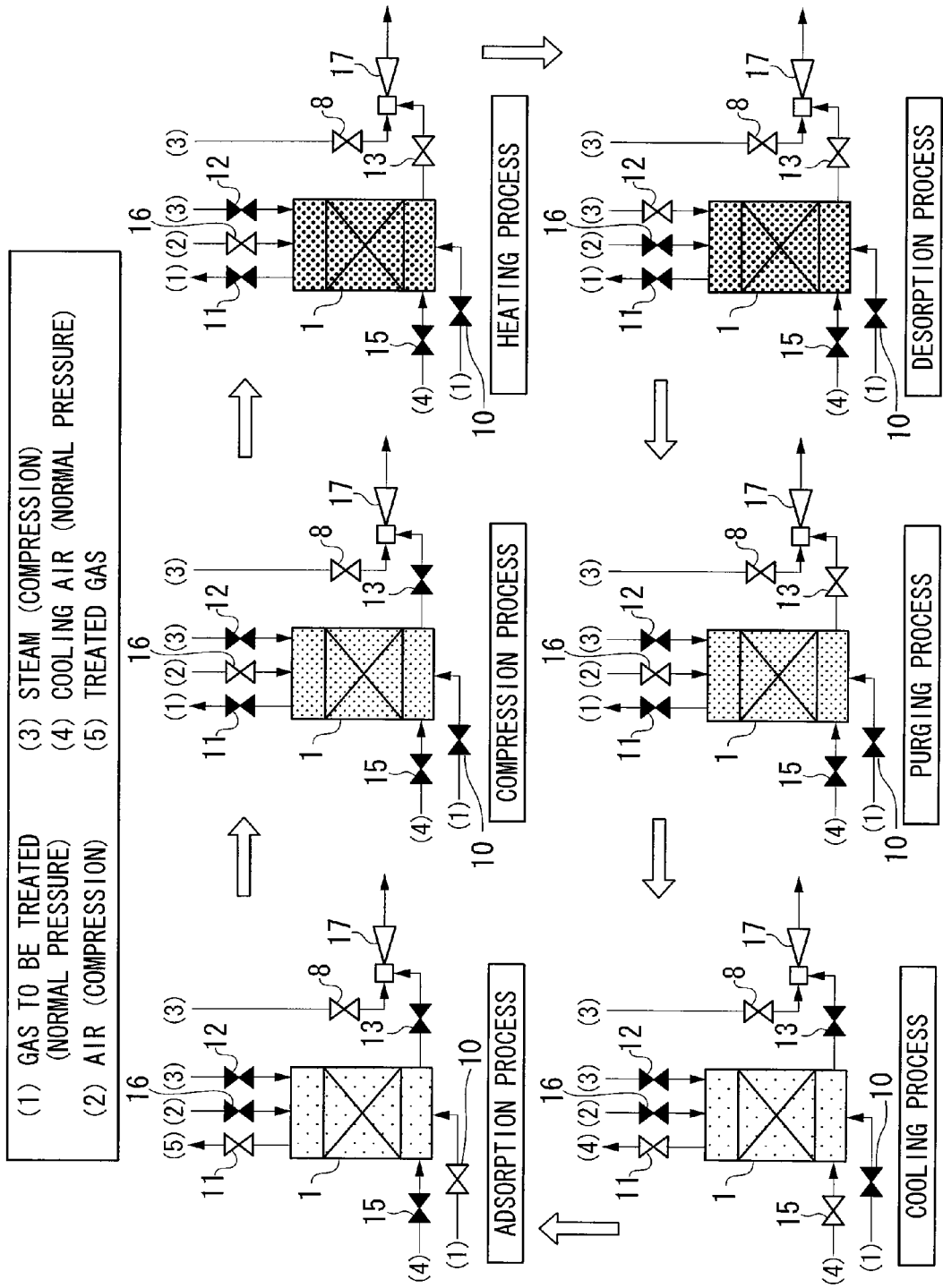
FIG. 2 is an operation view illustrating a transition of operation of the volatile organic compound processing system according to the first embodiment of the present invention.

Hereinafter, a detailed description will be given of an operation of the formulated volatile organic compound processing system A1 with reference to FIG. 2 illustrating a transition of the operation.

In FIG. 2, among the open/close valves, every valve in a closed state is represented by a black valve symbol, and every valve in an opened state is represented by a white valve symbol. As illustrated in FIG. 2, in the volatile organic compound processing system A1, in accordance with open/close states of the open/close valves (the untreated gas supply valve 10, the treated gas discharge valve 11, the steam supply valve 12, the steam discharge valve 13, the cooling air supply valve 15, and the compressed air supply valve 16), the processes (the adsorption process, the compression process, the heating process, the desorption process, the purging process, and the cooling process) are respectively set. In response to sequential changes in open/close states of the open/close valves, the processes are repeatedly carried out in the order of the adsorption process, to the compression process, the heating process, the desorption process, the purging process, the cooling process, and back to the adsorption process.

In the adsorption process, each of the untreated gas supply valve 10 and the treated gas discharge valve 11 is set to be in an opened state, and each of the steam supply valve 12, the steam discharge valve 13, the cooling air supply valve 15 and the compressed air supply valve 16 is set to be in a closed state. Thus, the untreated gas (i.e., the gas to be treated) is supplied to the adsorption apparatus 1 through the untreated gas supply valve 10, and the treated gas is discharged from the adsorption apparatus 1 through the treated gas discharge valve 11. This supplied untreated gas is passed through an adsorbent or adsorption agent (e.g., activated carbon), to desorb and remove the volatile organic compound, and then discharged to the outside through the treated gas discharge valve 11 as treated gas containing no volatile organic compound.

After completion of this adsorption process, only the compressed air supply valve 16 is set to be opened whereby the compression process is started. In the compression process, compressed air discharged from the compressor 4 of the gas turbine 2 is consecutively supplied through the compressed air supply valve 16 to the adsorption apparatus 1 such that the internal pressure thereof is raised.

Then, only the compressed air supply valve 16 and the steam discharge valve 13 are set to be opened such that the process of the volatile organic compound processing system A1 is shifted to the heating process. In the heating process, compressed air heated to 100° C.~400° C. by the compressor 4 is consecutively supplied through the compressed air supply valve 16 to the adsorption apparatus 1. The compressed air in the adsorption apparatus 1 is consecutively discharged and supplied to the combustor 5 through the steam discharge valve 13, the ejector 17, and the steam injection control valve 9. Namely, the inside of the adsorption apparatus 1 is heated to 100° C. or more under a predetermined pressurized state.

As described above, in the heating process, the compressed air discharged from the compressor 4 is passed through the adsorption agent filled in the adsorption apparatus 1 and discharged therefrom, and then supplied to the combustor 5. Generally, due to especially pressure loss in the adsorption apparatus 1, it is difficult to supply a necessary flow rate (or quantity) of compressed air from the adsorption apparatus 1 to the combustor 5 for rendering the temperature inside the adsorption apparatus 100° C. or more in a predetermined short period of time. However, in the present volatile organic compound processing system A1, such inconvenience is resolved or settled by providing the ejector 17. In detail, with the aid of a flow of steam supplied through the steam bypass control valve 8 from the steam generating apparatus 3, the ejector 17 forces the compressed air out of the adsorption apparatus 1 such that a sufficient flow rate of compressed air is passed through the adsorption apparatus 1.

After completion of this heating process, only the steam supply valve 12 and the steam discharge valve 13 are set to be opened whereby the desorption process is started. In the desorption process, steam supplied from the steam generating apparatus 3 is consecutively supplied through the steam supply valve 12 to the adsorption apparatus 1. Together with this, steam containing a volatile organic compound which has been desorbed from the adsorption agent due to operation of steam (or simply referred to as steam containing compound) is discharged from the adsorption apparatus 1 and then supplied to the combustor 5 through the steam discharge valve 13, the ejector 17, and the steam injection valve 9.

In the heating process, which is a pre-process before the desorption process, the inside of the adsorption apparatus 1 is heated to 100° C. or more as described above. Therefore, in the desorption process, steam which has been supplied to the adsorption apparatus 1 is not condensed in the adsorption apparatus 1 and is maintained in a gaseous state. In other words, in the adsorption apparatus 1 in the volatile organic compound processing system A1, water vapor or steam is not condensed, so that equipment is unnecessary for treating such condensed water as drain water.

In this desorption process, when a sufficient amount of volatile organic compound has been desorbed from the adsorption agent, only the steam discharge valve 13 and the compressed air supply valve 16 are set to be opened such that the process is shifted to the purging process. In the purging process, compressed air is supplied through the compressed air supply valve 16 to the adsorption apparatus 1, and at the same time, inside air is gradually discharged from the adsorption apparatus 1. As a result, steam or water vapor remaining in the adsorption apparatus 1 is discharged from the adsorption apparatus 1 by the compressed air supplied, so that the inside of the adsorption apparatus 1 is dried.

When this process is finished, only the treated gas discharge valve 11 and the cooling air supply valve 15 are set to be opened such that the process is shifted to the cooling process.

In the cooling process, air fed from the cooling air fan 14 is supplied through the cooling air supply valve 15 to the adsorption apparatus 1, and at the same time, a gas therein is discharged outside through the treated gas discharge valve 11, whereby the inside of the adsorption apparatus 1 is cooled to room temperature (or normal temperature). With the thus structured cooling operation, the above-described adsorption process is carried out under a normal temperature environment thus formed in the adsorption apparatus 1.

In the present embodiment, because the heating process is provided as a pre-process before the desorption process, it is possible to prevent water vapor from being condensed into condensed water in the adsorption apparatus 1 such that drain water is not generated in the adsorption apparatus 1. As such, provision or equipment for treating drain water is unnecessary, and to such an extent, the cost of equipment can be reduced.

Further, in the heating process, although compressed air discharged from the adsorption apparatus 1 contains a volatile organic compound, the amount thereof is small. In the present embodiment, the compressed air is fed to the combustor 5 for being treated. On the other hand, dedicated equipment or facility for treating or decomposing such compressed air containing a volatile organic compound is unnecessary, and to such an extent, cost of equipment can be reduced.

Incidentally, in the present volatile organic compound processing system A1, in addition to the water vapor (or steam) containing compound discharged from the adsorption apparatus 1, the water vapor (or steam) which has been fed through the steam bypass control valve 8 is supplied through the steam injection control valve 9 to the combustor 5. In other words, in the present volatile organic compound processing system A1, because the steam bypass control valve 8 is provided therein, the amount of water vapor for combustion (or the combustion steam quantity) and the amount of water vapor for adsorbing the compound (or the compound adsorption quantity) can be set individually or separately.

Second Embodiment

For example, provided that the combustion steam quantity is a flow rate R1, the compound adsorption quantity is a flow rate R2 (where R1>R2), and the difference in flow rate between R1 and R2 is supplied through the steam bypass control valve 8 to the steam injection control valve 9. The requirements for both of the combustion steam quantity and the compound adsorption quantity can be satisfied. The case where R1<R2 can be assumed. However, it is not practical because a condition where the compound adsorption steam quantity is not entirely treated by the gas turbine 2 is presented.

Figure 3:
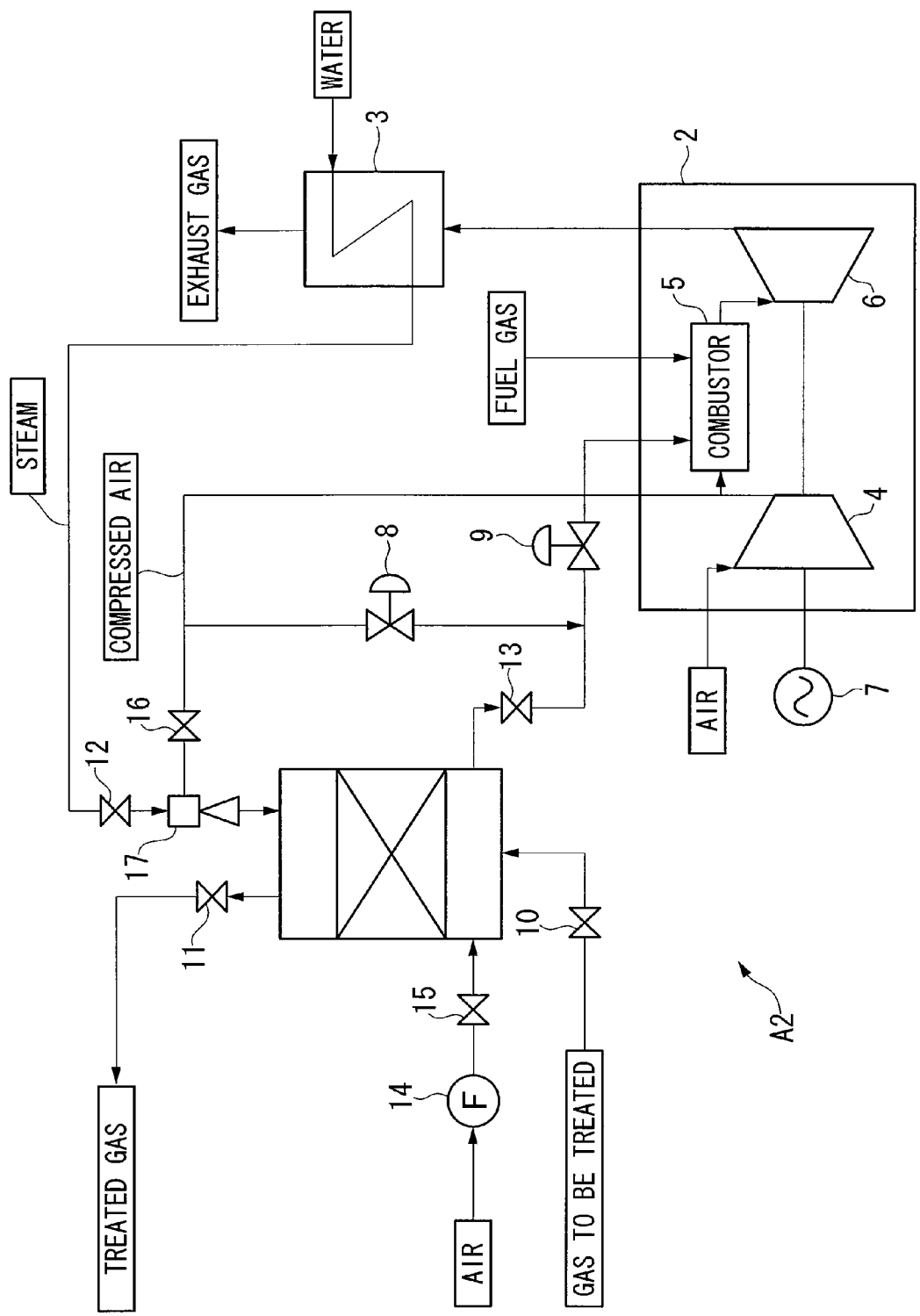
FIG. 3 is a system structural view illustrating a characteristic configuration of a volatile organic compound processing system according to a second embodiment of the present invention.

FIG. 3 is a system structural view of a volatile organic compound processing system A2 according to a second embodiment of the present invention. As compared with the volatile organic compound processing system A1 shown in FIG. 1, the location (or place) of the ejector 17 in the volatile organic compound processing system A2 is different from that of the volatile organic compound processing system A1. The structure of the present volatile organic compound processing system A2 other than the location of the ejector 17 is similar to the structure of the volatile organic compound processing system A1 of the first embodiment. In light of this, such different points will be mainly described below.

In the present volatile organic compound processing system A2, the ejector 17 is provided at the steam supply port of the adsorption apparatus 1 (or between the steam supply valve 12 and the adsorption apparatus 1) and driven by steam flowing from the steam supply valve 12 to the adsorption apparatus 1. Compressed air discharged from the compressor 4 is supplied to the ejector 17 through the compressed air supply valve 16. This compressed air is compulsorily bled towards the adsorption apparatus 1 by means of the flow of steam supplied through the steam supply valve 12 to the adsorption apparatus 1.

Figure 4:
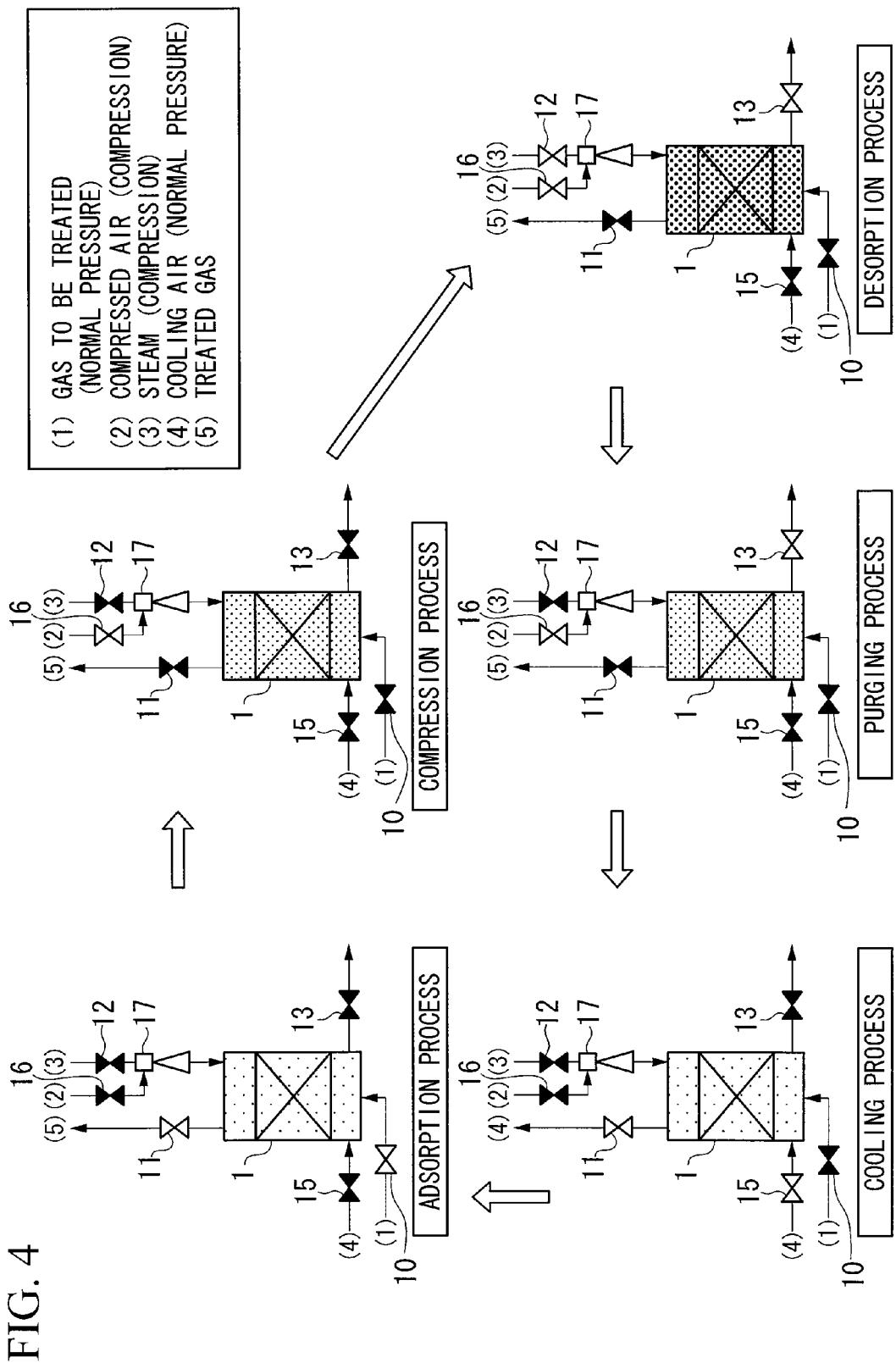
FIG. 4 is an operation view illustrating a transition of operation of the volatile organic compound processing system according to the second embodiment of the present invention.

FIG. 4 is a view illustrating a transition of operation of the thus-structured volatile organic compound processing system A2. In the adsorption process, only the untreated gas supply valve 10 and the treated gas discharge valve 11 are set to be opened such that gas to be treated is supplied to the adsorption apparatus 1 through the untreated gas supply valve 10 and that gas which has been treated or treated gas is discharged outside through the treated gas discharge valve 11. In the heating process, which is a post-process after the adsorption process, only the compressed air supply valve 16 is set to be opened such that compressed air is introduced in the adsorption apparatus 1 through the compressed air supply valve 16 so that the adsorption apparatus 1 is internally pressurized.

In the desorption process or after the adsorption apparatus 1 has been internally compressed, only the steam supply valve 12, the steam discharge valve 13, and the compressed air supply valve 16 are set to be opened such that steam is consecutively supplied to the adsorption apparatus 1, steam containing compound is consecutively discharged from the adsorption apparatus 1, and compressed air heated to 100° C.~400° C. is consecutively supplied to the adsorption apparatus 1 by means of an operation of the ejector 17. In other words, in the present volatile organic compound processing system A2, the steam at a level of 100° C. and the compressed air at 100° C.~400° C. are mixed and then supplied to the adsorption apparatus 1 whereby the steam can be heated by the compressed air and partial pressure of the steam can be reduced and the condensing temperature can be lowered.

Accordingly, in the present volatile organic compound processing system A2, in a initial stage of the desorption process or at the time of starting a supply of a mixed gas composed of the steam and the compressed air with respect to the adsorption apparatus 1, although the steam is condensed to a degree. After starting however, condensation of the steam in the adsorption apparatus 1 can be suppressed to a large extent, and therefore, a volume of drain water discharged from the adsorption apparatus 1 can be drastically reduced as compared with the conventional one. As a result, drain water treatment equipment can be downsized or miniaturized and the cost of equipment can be reduced for that.

Further, as can be seen from a comparison of FIG. 2 and FIG. 4, in the present volatile organic compound processing system A2, the mixed gas composed of the steam and the compressed air is supplied to the adsorption apparatus 1 in the desorption process whereby dedicated equipment for the heating process is unnecessary. Accordingly, due to the small constant of process, efficiency of treatment of untreated gas (or efficiency of gas treatment) can be improved.

Additionally, one of the principal ideas is that, by supplying to the adsorption apparatus 1 compressed air (specifically, air having high pressure and high temperature) formed in the gas turbine 2, condensation of the steam in the adsorption apparatus 1 can be suppressed or prevented. Accordingly, the present invention itself is not limited to the embodiments described above. For example, the following modifications are conceivable.

(1) In each of the embodiments described above, condensation of steam in the adsorption apparatus 1 is suppressed or prevented by using compressed air generated in the compressor 4 of the gas turbine 2. However, the invention is not limited to compressed air generated in a compressor. A structure is also possible in which, by providing a dedicated apparatus for generating compressed air and by using compressed air generated in the dedicated apparatus, condensation is suppressed or prevented.

(2) In each of the embodiments described above, the ejector 17 is used as a suction apparatus. However, other types of suction apparatuses may be used. For example, it is conceivable to use a turbocharger.

(3) The applicant has filed a PCT international application No. PCT/JP2005/015061 entitled "METHOD OF PROCESSING VOLATILE ORGANIC COMPOUND BY USING GAS TURBINE AND PROCESSING SYSTEM OF VOLATILE ORGANIC COMPOUND", with the concept of adsorption and desorption of volatile compound being the same as the present invention. In this international application, it is described that a plurality of adsorption apparatuses are provided and operated alternately and that, as a pre-process before an adsorption process, an enriching process is provided in which volatile organic compound contained in gas to be treated is enriched. Application of the technique described in this international application to the present invention is conceivable.

(4) In each of the embodiments described above, the steam injection control valve 9 is provided at a downstream side of the steam bypass control valve 8 in a flow direction of steam (or between the steam bypass control valve 8 and the gas turbine 2). However, the steam injection control valve 9 may be provided at a upstream side of the steam bypass control valve 8 (or between the steam generating apparatus 3 and the steam bypass control valve 8). In this structure, the same operation and effects are obtainable as described above.

What is claimed is:

1. A method of processing a volatile organic compound by using a gas turbine having a compressor and a combustor, the method comprising:
   adsorbing in an adsorption agent a volatile organic compound contained in gas to be treated;
   desorbing the volatile organic compound adsorbed in the adsorption agent from the adsorption agent by mixing the adsorption agent with steam;
   suppressing or preventing condensation of the steam by supplying compressed air generated by the gas turbine compressor to pressurize the mixing of the steam and the adsorption agent; and
   burning the steam mixed with the volatile organic compound in a combustor of the gas turbine.

2. The method as recited in claim 1, wherein the compressed air used for desorbing the volatile organic compound from the adsorption agent is supplied to the combustor to serve as combustion air.

3. The method as recited in claim 1, wherein part of the steam is supplied directly to the combustor without being used for desorbing the volatile organic compound.

4. The method as recited in claim 1, wherein the state in which the condensation of the steam is suppressed by the use of the compressed air is related to heating the steam by the use of the compressed air in a pre-process before desorbing the volatile organic compound from the adsorption agent by the use of the steam.

5. The method as recited in claim 1, wherein the state in which the condensation of the steam is suppressed through the use of the compressed air is related to mixing the steam and the compressed air and making the mix to serve for desorbing the volatile organic compound.

* * * * *